US008224566B2

(12) United States Patent
Lyons

(10) Patent No.: US 8,224,566 B2
(45) Date of Patent: Jul. 17, 2012

(54) APPARATUS AND METHOD TO INDICATE COURSE DEVIATION INSTRUMENT SATURATION

(75) Inventor: Peter Lyons, Albuquerque, NM (US)

(73) Assignee: Aspen Avionics, Inc., Albuquerque, NM (US)

( * ) Notice: Subject to any disclaimer, the term of this patent is extended or adjusted under 35 U.S.C. 154(b) by 553 days.

(21) Appl. No.: 12/176,838

(22) Filed: Jul. 21, 2008

(65) Prior Publication Data

US 2010/0036607 A1 Feb. 11, 2010

Related U.S. Application Data

(60) Provisional application No. 60/951,206, filed on Jul. 21, 2007.

(51) Int. Cl.
*G01C 21/00* (2006.01)
(52) U.S. Cl. .................................. 701/408; 701/441
(58) Field of Classification Search .................. 701/207, 701/211, 213, 200, 408, 441, 412, 3, 10, 701/14; 340/971, 963, 945
See application file for complete search history.

(56) References Cited

U.S. PATENT DOCUMENTS

| 4,069,412 | A | * | 1/1978 | Foster et al. ................. 701/206 |
| 5,668,542 | A | * | 9/1997 | Wright .......................... 340/971 |
| 5,833,467 | A | * | 11/1998 | Dodd ............................ 434/243 |
| 6,118,385 | A | * | 9/2000 | Leard et al. ................... 340/688 |
| 6,174,283 | B1 | * | 1/2001 | Nevo et al. .................... 600/301 |
| 6,809,657 | B1 | * | 10/2004 | Parker et al. .................. 340/945 |
| 6,885,313 | B2 | * | 4/2005 | Selk, II et al. ................ 340/945 |
| 6,967,598 | B2 | | 11/2005 | Mills |
| 7,009,553 | B1 | * | 3/2006 | Billings ........................ 342/120 |
| 7,142,131 | B2 | * | 11/2006 | Sikora .......................... 340/971 |
| 7,184,883 | B2 | * | 2/2007 | Wischmeyer ................ 701/200 |
| 7,237,747 | B1 | * | 7/2007 | Baudry ....................... 244/76 R |
| 7,367,526 | B2 | * | 5/2008 | Baudry ....................... 244/76 R |
| 7,436,323 | B2 | * | 10/2008 | Ishihara et al. ............... 340/951 |
| 7,714,740 | B2 | * | 5/2010 | Lipman ........................ 340/688 |
| 2002/0008641 | A1 | | 1/2002 | Sample et al. |
| 2003/0132860 | A1 | * | 7/2003 | Feyereisen et al. .......... 340/973 |
| 2004/0189492 | A1 | | 9/2004 | Selk, II et al. |
| 2005/0057376 | A1 | | 3/2005 | Naimer et al. |
| 2005/0153701 | A1 | | 7/2005 | Ettore et al. |
| 2007/0236366 | A1 | * | 10/2007 | Gur et al. ...................... 340/945 |
| 2008/0177439 | A1 | * | 7/2008 | Betters et al. .................. 701/35 |
| 2010/0023258 | A1 | | 1/2010 | Rouquette et al. |

FOREIGN PATENT DOCUMENTS

EP 1273987 1/2003

* cited by examiner

*Primary Examiner* — Thomas Black
*Assistant Examiner* — Marthe Marc-Coleman
(74) *Attorney, Agent, or Firm* — Bryan P. Stanley; Marcelius A. Chase; Kutak Rock LLP

(57) ABSTRACT

An apparatus and method to maintain traditional navigational deviation presentation in a manner that is consistent with existing training and safety methodology, but eliminates confusion generated when a navigation needle is placed in a fully pegged position by positively indicating that a needle is off-scale and not representing an actual accurate deviation.

8 Claims, 1 Drawing Sheet

APPARATUS AND METHOD TO INDICATE COURSE DEVIATION INSTRUMENT SATURATION

CROSS-REFERENCE TO RELATED APPLICATIONS

This application claims priority to U.S. Provisional Patent Application Ser. No. 60/951,206, filed Jul. 21, 2007, titled APPARATUS AND METHOD TO INDICATE COURSE DEVIATION INSTRUMENT SATURATION, the disclosure of which is incorporated herein by reference in their entirety.

BACKGROUND OF THE INVENTION

1. Field of the Invention

The present general inventive concept relates to displaying information on data display instruments and, more particularly, to an apparatus and a method of displaying course information and a degree of deviation therefrom on electronic aircraft flight data display instruments even when the degree of course deviation exceeds the limits of the display instruments so that the instruments become saturated.

2. Description of the Related Art

A navigational system on an aircraft presents guidance cues to a pilot in terms of "steering commands." These guidance cues are used to convey to the pilot whether the aircraft is on course or off course and are applied during multiple phases of flight. Specific examples of use include long-range en-route navigation and precision zero-visibility runway landings.

Guidance cues are generated when the aircraft is off course or "deviated" from a desired navigational course to an intended destination that has been programmed into the navigation system. Upon detecting a deviation, guidance cues are presented to the pilot in the form of steering commands such as "fly up" or "fly down" when vertical guidance is available, and/or "turn right" or "turn left" when lateral guidance is available.

Traditional implementations of these guidance cues have been presented via physical needles including a first needle that may move back and forth, or "deflect" to a left or a right of a center position, and a second needle that may deflect up or down of a center position. If both needles are in the center position, the aircraft is on the desired navigational course. If either needle is not in the center position, the needle is considered to be deflected and a steering command is generated to instruct the pilot as to the direction in which the aircraft should be maneuvered so that the deflected needle returns to the center position, thus returning the aircraft to the desired navigational course.

The degree of deflection of the first and/or second needle corresponds to the degree the aircraft has deviated from the desired navigational course. Small deviations are shown with small needle deflections while larger course deviations are likewise indicated via larger needle deflections. Thus, the amount that the pilot steers left/right or up/down, corresponds generally to the amount of needle deflection present to correct the navigational error.

The physical needle is limited by a range in that there is a maximum right deflection and a maximum left deflection. Since the degree of deflection relates to the degree in which the aircraft is off course, if the aircraft is significantly off course, the navigational error may be greater than what the physical needle can present, thus resulting in the needle being fully deflected or in a "pegged" position. When this condition occurs, the needle provides a misleading presentation.

For example, if a lateral position error is 5 nautical miles and the needle can only show a deviation of 3 nautical miles, the needle will be deviated to a maximum physical extent in either a left or right direction and in the pegged position. From the pilots point of view, there is no difference between a condition where the actual navigational error is 3 nautical miles and a conditional where the actual navigational error is greater than 3 nautical miles.

In this situation, the pilot will attempt to correct the heading by altering course in reliance of the pegged needle so that the needle returns to the center position. However, depending on the extent the aircraft is off course and the corresponding extent of pegging, the needle may remain in the pegged position for a period of time and possibly after significant course correction, which may cause the pilot to speculate as to the cause of why the needle is not moving. The pilot may assume that the needle is not moving because it is pegged, or the pilot may assume that the needle and/or another device is defective.

Even if the pilot speculates that the needle is pegged and is correct, the extent of pegging or heading deviation is unknown, which results in further speculation. Naturally, any pilot uncertainty is very dangerous even if the timeframe of uncertainty is merely a momentary window.

SUMMARY OF THE INVENTION

The present general inventive concept provides an apparatus and method to maintain traditional navigational deviation presentation in a manner that is consistent with existing training and safety methodology, but eliminates confusion generated when a navigation needle is placed in a fully pegged position by positively indicating that a needle is off-scale and not representing an actual accurate deviation.

Additional aspects and advantages of the present general inventive concept will be set forth in part in the description which follows and, in part, will be obvious from the description, or may be learned by practice of the present general inventive concept.

The foregoing and/or other aspects and advantages of the present general inventive concept may be achieved by providing an electronics display instrument configured to display aircraft course deviation, the instrument including a first input to receive navigation information, a second input to receive position information, a controller to compare the navigation information and position information to yield a signal, and an output to convey the signal by displaying a conditional symbol on a scale, wherein the conditional symbol has a first form and a second form to indicate whether the symbol is accurate.

The conditional symbol may correspond to a conventional readout having a limited measurement scale.

The conditional symbol may be moveable from a first extreme to a second extreme with a central position therebetween.

If the conditional symbol is between the first extreme and the second extreme, then the conditional symbol may be in the first form.

If the conditional symbol is not between the first extreme and the second extreme, then the conditional symbol may be in the second form.

The first form may indicate that the conditional symbol is accurate and the second form may indicate that the conditional symbol is not accurate.

The conditional symbol may be a bar and the first form may be the bar in a solid form and the second form may be the bar in an outlined form.

The position information may be displayed in real time.

The foregoing and/or other aspects and advantages of the present general inventive concept may be achieved by providing a method of conveying a condition using an electronics display instrument, the method including receiving navigation information via a first input, receiving position information via a second input, comparing the navigation information and position information via a controller to yield a measurable condition, displaying the condition with a symbol on a scale, the scale having a limited range, and varying a symbol appearance depending on whether the condition is measurable by the scale having the limited range.

The foregoing and/or other aspects and advantages of the present general inventive concept may also be achieved by displaying the symbol appearance in one of a first form if the condition is measurable by the scale and a second form if the condition is not measurable by the scale.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE INVENTION

Figure 1:
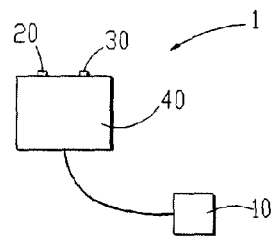
FIG. 1 illustrates a block diagram illustrating the present general inventive concept according to an exemplary embodiment.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

The present general inventive concept, as illustrated in FIG. 1, provides a navigational apparatus 1 having a readout 10 to display guidance cues to a pilot to indicate a plurality of factors related to whether an aircraft is on course or off course with respect to a desired navigational course. The navigational apparatus 1 has a plurality of inputs 20 and 30 to receive information such as, but not limited to, navigation and position information. A controller 40 performs a plurality of processes including comparing the navigation information and position information to yield a signal to a user and/or other apparatus, e.g., readout 10.

These guidance cues may be visual and/or audible commands and the plurality of factors may be states of the aircraft and/or the aircraft instruments, including generally, but not limited to, whether the aircraft is on course or off course, the degree the aircraft is on course of off course, and/or whether the navigational apparatus is providing an accurate reading. Moreover, if the aircraft is off course, the guidance cues may provide visual and/or audible steps to the pilot, i.e., "steering commands," so that the pilot may take action to return the aircraft to on course.

These guidance cues, presented to the pilot as steering commands, may be applied during multiple phases of flight. Specific examples of use may include long-range en-route navigation and precision zero-visibility runway landings.

Steering commands may be generated when the aircraft is off course or "deviated" from a desired navigational course to an intended destination that has been programmed into the navigation system. Upon detecting a deviation, steering commands may be presented to the pilot visually and/or audibly in the form of instructions such as "fly up" or "fly down" when vertical guidance is available, and/or "turn right" or "turn left" when lateral guidance is available.

Visual indicators may include displaying traditional aircraft instruments via electronic representations via the readout 10. Such electronic representations provide increased flexibility relative to mechanical needles and utilize display symbology, such as a needle symbol, to convey information to the pilot. The introduction of completely new and unique display symbology would raise a plurality of training and safety issues, particularly for pilots familiar with needle symbology. Therefore, consistency with conventional flight and navigational symbology is desired.

The readout 10 of the present general inventive concept provides display symbology (see FIGS. 2 and 3 generally) on an electronic flight display similar to that of older mechanical instruments to preserve familiarity and thereby increase the likelihood that a pilot, who is familiar with older mechanical instruments, will recognize the new display symbology on the electronic flight display.

Likewise, the steering commands may be presented in electronic format in a manner similar to that of older mechanical instruments, consisting of a vertical deviation bar to replace the vertical deviation needle and a lateral deviation bar to replace the lateral deviation needle.

Because of the importance of maintaining consistency between new electronic formats of the present general inventive concept and older mechanical instruments, which may include shapes and/or colors, the display symbology may have a number of limitations dictated by the manner in which the mechanical instruments display information. One such limitation of the needle symbol includes a maximum deviation.

Figures 2, 3:
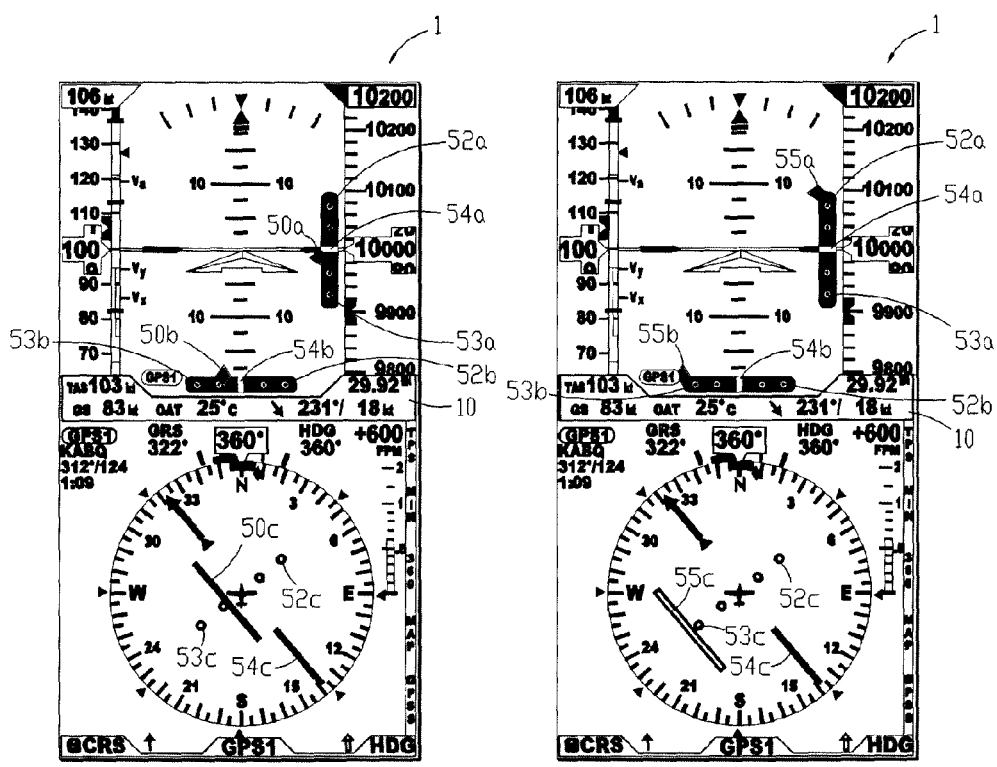
FIG. 2 illustrates a front elevation view of a display having needle symbol in a normal non-pegged state according to an exemplary embodiment of the present general inventive concept.
FIG. 3 illustrates a front elevation view of a display having a needle symbol in a pegged state according to an exemplary embodiment of the present general inventive concept.

Like the older mechanical needle, a needle symbol 50*a*, 50*b*, and 50*c* of the electronic flight display may be designed to be limited by a range having a maximum first deflection 52*a*, 52*b*, and 52*c*, and a maximum second deflection 53*a*, 53*b*, and 53*c* with respect to a center position 54*a*, 54*b*, 54*c*, as illustrated in FIGS. 2 and 3. Since the degree of deflection relates to the degree in which the aircraft is off course, if the aircraft is significantly off course, the navigational error may be greater than what the needle symbol 50*a*, 50*b*, and 50*c* can present, thus resulting in a fully deflected or in a "pegged" needle symbol 55*a*, 55*b*, and 55*c*, as illustrated in FIG. 3. This condition results in display ambiguity and pilot uncertainty.

Unlike a traditional mechanical needle, the needle symbol 50*a*, 50*b*, and 50*c* of the electronic flight display of the present general inventive concept provides positive indication if the needle symbol 50*a*, 50*b*, and 50*c* is an off-scale or pegged needle symbol 55*a*, 55*b*, and 55*c*. In one embodiment, the off-scale needle symbol 55*a*, 55*b*, and 55*c* is represented by altering the appearance of the off-scale needle symbol from the normal, on-scale needle symbol 55*a*, 55*b*, and 55*c*. Such changes of form are accomplished by "ghosting" whereby the normal needle symbol 50*a*, 50*b*, and 50*c* changes color and/or shape to become the pegged needle symbol 55a, 55b, and 55c, as illustrated in FIG. 3. Nevertheless, it will be appreciated that various other forms of changes between the normal needle symbol 50a, 50b, and 50c and the pegged needle symbol 55a, 55b, and 55c may be utilized without departing from the spirit and scope of the present general inventive concept.

In another embodiment, if the normal needle symbol 50a, 50b, and 50c becomes the pegged needle symbol 55a, 55b, and 55c, a color of the normal needle symbol 50a, 50b, and 50c or a color of a portion of the normal needle symbol 50a, 50b, and 50c changes from a first display color to a second, more subtle color to indicate the pegged needle 55a, 55b, and 55c. For example, the normal needle symbol 50a, 50b, and 50c may have a base primary color, such as bright green, which to indicate the pegged needle symbol 55a, 55b, and 55c, changes to a darker version of the same primary color, such as dark green.

Other changes of form include changing the pegged needle symbol 55a, 55b, and 55c to an outlined form of the on-scale needle symbol 50a, 50b, and 50c, thus equating the displayed position to a place-holder for the on-scale needle symbol.

Thus, given the increased versatility of the electronic display 1 of the present general inventive concept, it is possible to eliminate the misleading condition that is created when the deviation needle is fully deflected and "off-scale" by altering the symbology.

In use, a pilot inputs a desired navigational course into a navigation system. During flight, the pilot may occasionally reference an instrument having two needle symbols to indicate whether the aircraft is on or off course with respect to the desired navigational course. The needle symbols may be on one or more instruments and may include any number of needle symbols or other like symbology. If the pilot drifts off course, one or more of the needle symbols may deviate from a center position to indicate the aircraft is left or right and/or higher or lower than the desired navigational course. An audible alarm may sound and/or steering commands may sound to alert the pilot that the aircraft is off course. If the needle symbol, for example, is limited to displaying a maximum deviation of 3 nautical miles and if an actual lateral position error of the aircraft begins to exceed 3 nautical miles, the needle symbol will be deviated or pegged to a maximum physical extent in either a left or right direction. When the needle symbol reaches its maximum deviation of 3 nautical miles, the needle symbol will change appearance to positively indicate to the pilot that the needle is pegged and that the aircraft is off course an excess of 3 nautical miles. Thus, the pilot will begin to correct the course of the aircraft while the needle symbol remains pegged. Since the needle symbol is positively indicating its pegged state, any pilot uncertainty as to why the needle symbol is not moving is eliminated.

An additional instrument and/or display may be included to cooperate with the needle symbol and instrumentation thereof to display the extent the needle symbol is pegged and/or the extent the aircraft is off course.

The present general inventive concept may be embodied in a retrofit device. In this scenario, the retrofit device may encompass not only the present general inventive concept, but may also include a back-up battery, a back-up GPS, and/or a data converter to enable the present general inventive concept to utilize wiring from the older mechanical needle and instrumentation thereof.

While the exemplary embodiment of the present general inventive concept is in an aircraft, the present general inventive concept may be employed in other types of vehicles such as water, land, and space vehicles.

Embodiments of the present general inventive concept, including but not limited to symbology, changing of symbology to represent states including off-scale and on-scale conditions, processing of data utilized to control symbology, and/or data including sensory data that the symbology represents, can be written as computer programs, stored on computer-readable recording media, and read and executed by computers. Examples of such computer-readable recording media include magnetic storage media, e.g., ROM, floppy disks, and hard disks, optical recording media, e.g., CD-ROMs, and DVDs, and storage media such as carrier waves, e.g., transmission over the Internet. The computer-readable recording media can also be distributed over a network of coupled computer systems so that the computer-readable code is stored and executed in a decentralized fashion.

As described above, the present general inventive concept provides an apparatus and method to maintain the traditional navigational deviation presentation in a manner that is consistent with existing training and safety methodology, but eliminates the confusion generated when a navigation needle is placed in the fully pegged position by positively indicating that the needle is off-scale and not representing an actual accurate deviation.

Although a few exemplary embodiments of the present general inventive concept have been illustrated and described, it will be appreciated by those skilled in the art that changes may be made in these exemplary embodiments without departing from the principles and spirit of the general inventive concept, the scope of which is defined in the appended claims and their equivalents.

What is claimed is:

1. An electronics display instrument configured to display aircraft course deviation, the instrument comprising:
   a first input to receive navigation information of the aircraft;
   a second input to receive position information of the aircraft;
   a controller to compare the navigation information and position information to yield a signal; and
   an output to convey the signal by displaying a conditional symbol on a limited measurement scale, wherein the conditional symbol corresponds to a conventional readout of an instrument configured to display aircraft course deviation, and wherein the conditional symbol is moveable from a first extreme to a second extreme with a central position therebetween;
   wherein the conditional symbol being in the central position indicates the aircraft is on course, and the conditional symbol being in the first or second extreme positions indicates the aircraft is off course in a first or a second direction by an amount at least equal to the measurement scale;
   wherein the conditional symbol has a first form to indicate that the aircraft is off course by an amount within the measurement scale, and a second form to indicate that the aircraft is off course by an amount in excess of the measurement scale.

2. The instrument according to claim 1, wherein if the conditional symbol is between the first extreme and the second extreme, then the conditional symbol is in the first form.

3. The instrument according to claim 1, wherein if the conditional symbol is at the first extreme or the second extreme and the aircraft is off course by an amount in excess of the measurement scale, then the conditional symbol is in the second form.

4. The instrument according to claim 1, wherein the first form indicates that the conditional symbol is accurate and the second form indicates that the conditional symbol is not accurate with respect to the measurement scale.

5. The instrument according to claim 1, wherein the conditional symbol is a bar and the first form is the bar in a solid form and the second form is the bar in an outlined form.

6. The instrument according to claim 1, wherein the position information is displayed in real time.

7. A method of conveying aircraft course deviation using an electronics display instrument, the method comprising:
- receiving navigation information of the aircraft via a first input;
- receiving position information of the aircraft via a second input;
- comparing the navigation information and position information via a controller to yield a measurable aircraft course deviation;
- displaying the aircraft course deviation with a symbol on a scale, the scale having a limited range including a first extreme, a second extreme and a central position therebetween;
- positioning the symbol at the central position to indicate the aircraft is on course, and positioning the symbol at the first or second extreme positions to indicate the aircraft is off course in a first or second direction by an amount at least equal to the scale; and
- varying a symbol appearance depending on whether the aircraft course deviation is measurable by the scale having the limited range.

8. The method according to claim 7, further comprising:
displaying the symbol appearance in one of a first form if the aircraft course deviation is measurable by the scale and a second form if the aircraft course deviation is not measurable by the scale.

* * * * *